United States Patent [19]

Kawamura et al.

[11] Patent Number: 4,915,615
[45] Date of Patent: Apr. 10, 1990

[54] DEVICE FOR CONTROLLING FUEL COMBUSTION IN A BURNER

[75] Inventors: Hideo Kawamura, Samukawa; Keiichi Yamashita, Yokohama, both of Japan

[73] Assignee: Isuzu Motors Limited, Tokyo, Japan

[21] Appl. No.: 121,274

[22] Filed: Nov. 16, 1987

[30] Foreign Application Priority Data

Nov. 15, 1986 [JP] Japan .................................. 61-272682

[51] Int. Cl.⁴ .............................................. F23N 1/00
[52] U.S. Cl. ........................................ 431/41; 431/78; 431/89; 431/247; 431/36; 431/259; 431/262; 237/2 A; 237/12.3 C
[58] Field of Search ............... 431/11, 41, 80, 78, 431/89, 247, 254, 262, 328, 36, 259; 123/145 A, 179 H, 552, 550, 551; 237/2 A, 12.3 C

[56] References Cited

U.S. PATENT DOCUMENTS

| | | | |
|---|---|---|---|
| 1,834,289 | 12/1931 | McCabe | 431/258 X |
| 2,286,855 | 6/1942 | Holthouse | 237/12.3 C |
| 4,519,772 | 5/1985 | Mittmann | 237/2 A X |
| 4,613,072 | 9/1986 | Kikuchi et al. | 237/2 A X |
| 4,620,511 | 11/1986 | Brooks et al. | 123/145 A |
| 4,648,361 | 3/1987 | Hales | 431/262 X |
| 4,658,772 | 4/1987 | Auth et al. | 123/145 A |
| 4,744,747 | 5/1988 | Kawamura et al. | 237/12.3 C |

FOREIGN PATENT DOCUMENTS 2130710 6/1984 United Kingdom .

OTHER PUBLICATIONS

Patent Abstracts of Japan, vol. 10, No. 360, (M-541)[2417], Dec. 3, 1986; & JP-A-61 157 422 (Isuzu Motors Ltd) 17-07-1986.
Patent Abstracts of Japan, vol. 10, No. 270 (M-517)[2326], Sep. 13, 1986; & JP-A-61 92 911 (Isuzu Motors Ltd) 10-05-1986.
Patent Abstracts of Japan, vol. 10, No. 134 (M-479)[2191], May 17, 1986; & JP-A-60 259 808 (Toushiba Netsukigu K.K.) 21-12-1985.

Primary Examiner—Carl D. Price
Attorney, Agent, or Firm—Staas & Halsey

[57] ABSTRACT

A device for controlling fuel combustion in a burner detects the temperature in the burner and controls, based on the detected temperature, electric power supplied to an atmozing glow plug of a fuel atomizer which heats and atomizes fuel.

5 Claims, 3 Drawing Sheets

DEVICE FOR CONTROLLING FUEL COMBUSTION IN A BURNER

BACKGROUND OF THE INVENTION

The present invention relates to a device for controlling fuel combustion in a burner of a heater for a motor vehicle.

The passenger compartment or cabin of a motor vehicle is generally heated by a heat source employing the cooling water of the internal combustion engine of the motor vehicle. However, in cold weather, it takes time to increase the temperature of the cooling water, and hence the compartment cannot be heated quickly.

Japanese Laid-Open Patent Publication No. 61-157422 discloses a vehicle heater device in which fuel is combusted by a burner separate from the internal combustion engine and heat generated by the fuel combustion is recovered by a heat exchanger to supply heating air into the compartment. The heater device includes a fuel atomizer disposed in the burner for atomizing fuel, the fuel atomizer having an atomizing glow plug which is kept at a prescribed temperature.

An experiment conducted by the inventor indicates that fuel is atomized by the fuel atomizer in different conditions dependent on the temperature of the fuel atomizer including the atomizing glow plug, and cannot be sufficiently atomized if the temperature is excessively high. More specifically, if the temperature of the fuel atomizer including the atomizing glow plug is too high, supplied fuel is set off upon abrupt conversion from the liquid phase to a gaseous phase at the instant the fuel contacts the heated glow plug of the fuel atomizer, and is separated from the glow plug as large fuel droplets. Therefore, the fuel cannot be well atomized and hence cannot be well ignited subsequently.

SUMMARY OF THE INVENTION

It is an object of the present invention to provide a device for controlling fuel combustion in a burner by controlling electric power supplied to an atomizing glow plug of a fuel atomizer dependent on the temperature in the burner so that fuel can sufficiently be atomized without an atomization failure due to excessive heating of the fuel, for good fuel combustion in the burner.

According to the present invention, there is provided a device for controlling fuel combustion in a burner having a fuel atomizer having an atomizing glow plug for heating and atomizing fuel and an igniting glow plug for igniting the fuel atomized by the fuel atomizer, the device comprising temperature detecting means for detecting the temperature in the burner, and control means for controlling electric power supplied to the atomizing glow plug based on a signal from the temperature detecting means.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
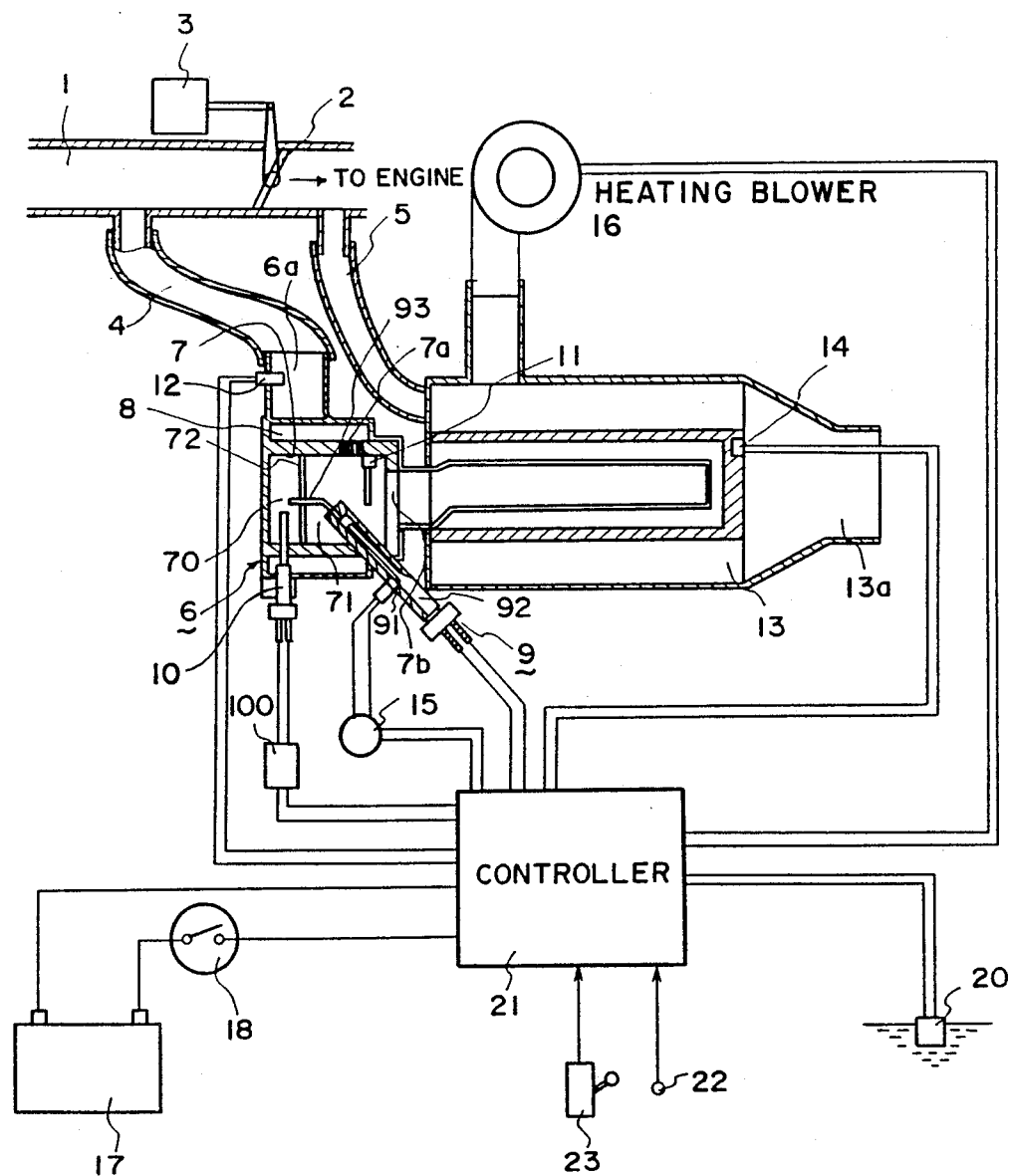
FIG. 1 is a schematic view of a control device for a burner according to the present invention.

As shown in FIG. 1, an intake pipe or air duct 1 for an internal combustion engine has one end connected to an air cleaner (not shown) and the other end connected to an intake manifold (not shown) of the internal combustion engine. An intake air control valve 2 is disposed in the intake pipe 2 and controlled for its opening by an actuator 3.

An air inlet pipe 4 is connected at one end thereof to the intake pipe 1 upstream of the control valve 2 in the direction in which air flows in the intake pipe 1. The other end of the air inlet pipe 4 is coupled to an air inlet pipe 6a of a burner 6. Air introduced through the air inlet pipe 4 into the burner 6 is mixed with fuel (described later) into an air-fuel mixture, which is combusted in the burner 6. Combustion gases produced by the combustion of the air-fuel mixture are introduced into a heat exchanger 13 from which the combustion gases are discharged through a discharge pipe 5 into the intake pipe 1 downstream of the control valve 2 and then fed into the internal combustion engine.

The burner 6 has an air inlet 7a and an air outlet 7b. The burner 6 also includes a combustion tube 7 having an ignition chamber 70 and a combustion chamber 71 which are defined therein by a perforated partition 72, an air inlet passage 8 defined around the combustion tube 7 and communicating with the air inlet pipe 6a, a fuel atomizer 9 for atomizing fuel, and an igniting glow plug 10 for igniting the fuel which is atomized by the fuel atomizer 9. An atmospheric temperature sensor 12 is disposed in the air inlet pipe 6a for detecting the temperature of air delivered into the burner 6. The atmospheric temperature sensor 12 serves to predict a change in the temperature in the combustion chamber 71 dependent on the temperature of air delivered into the combustion chamber 71. A flame sensor 11 is disposed in the combustion chamber 71 for detecting the temperature of flames to detect the condition of fuel combustion. Temperature signals from the sensors 11, 12 are applied to a controller 21 (described later).

The fuel atomizer 9 has a tubular body 91 projecting into the combustion chamber 71 and supplied with fuel, a rod-shaped atomizing glow plug 92 positioned in the body 91 and having a resistance wire of a positive temperature coefficient of resistance embedded centrally therein, the glow plug 92 being made of a ceramic material such as silicon nitride ($Si_2No_4$), and a nozzle 93 for ejecting atomized fuel heated by the atomizing glow plug 92 into the ignition chamber 70.

The igniting glow plug 10 is in the form of a rod made of a ceramic material such as silicon nitride ($Si_2No_4$) and has a resistance wire of a positive temperature coefficient of resistance embedded centrally therein. The glow plug 10 is connected to a plug resistance detector 100 for detecting the temperature of the glow plug 10. By measuring an energizing current flowing through the plug resistance detector 100, the temperature of the igniting glow plug 10 is detected from its resistance based on its resistance-to-temperature characteristic. Therefore, the temperature in the ignition chamber 70 can be detected. A temperature signal from the plug resistance detector 100 is applied to the controller 100.

Operation of the burner 6 thus constructed is as follows: Fuel is fed through a fuel control valve 15 into the body 91 of the fuel atomizer 9, and then heated and atomized by the atomizing glow plug 92. The atomized fuel is ejected from the nozzle 93 into the ignition chamber 70. The atomized fuel ejected into the ignition chamber 70 is mixed with air introduced from the air inlet 7a through the combustion chamber 71 and the apertures of the partition 72 into the ignition chamber 70. The air-fuel mixture is ignited by the igniting glow plug 10 thereby to produce combustion gases which then enter the combustion chamber 71 through the apertures of the partition 72. In the combustion chamber 71, the combustion gases are mixed with a large amount of air to promote fuel combustion. Thereto, the combustion gases are delivered from the outlet 7b of the combustion tube 7 into the heat exchanger 13, from which the combustion gases are discharged via the discharge pipe 5 into the intake pipe 1. The heat exchanger 13 is supplied with heating air from a heating blower 16, and the supplied air is heated by the heat of the combustion gases. The heated air is introduced from an outlet 13a of the heat exchanger 13 into the compartment or cabin.

The temperature of the heat exchanger 13 is detected by a temperature sensor 14 which applies its signal to the controller 21.

When a starter switch 18 is turned on, electric power is supplied from a battery 17 to the controller 21 and other components. The temperature of cooling water in the internal combustion engine is detected by a cooling water thermosensor 20. The load imposed on the engine is detected by a load sensor 22. Denoted at 23 is a heating position switch.

The controller 21 is an electronic control unit comprising a microcomputer. The controller 21 receives various signals from the atmospheric temperature sensor 12, the flame sensor 11, and other sensors, and controls various actuators such as the actuator 3, the heating blower 16, and the fuel control valve 15 according to a predetermined program.

Figure 2:
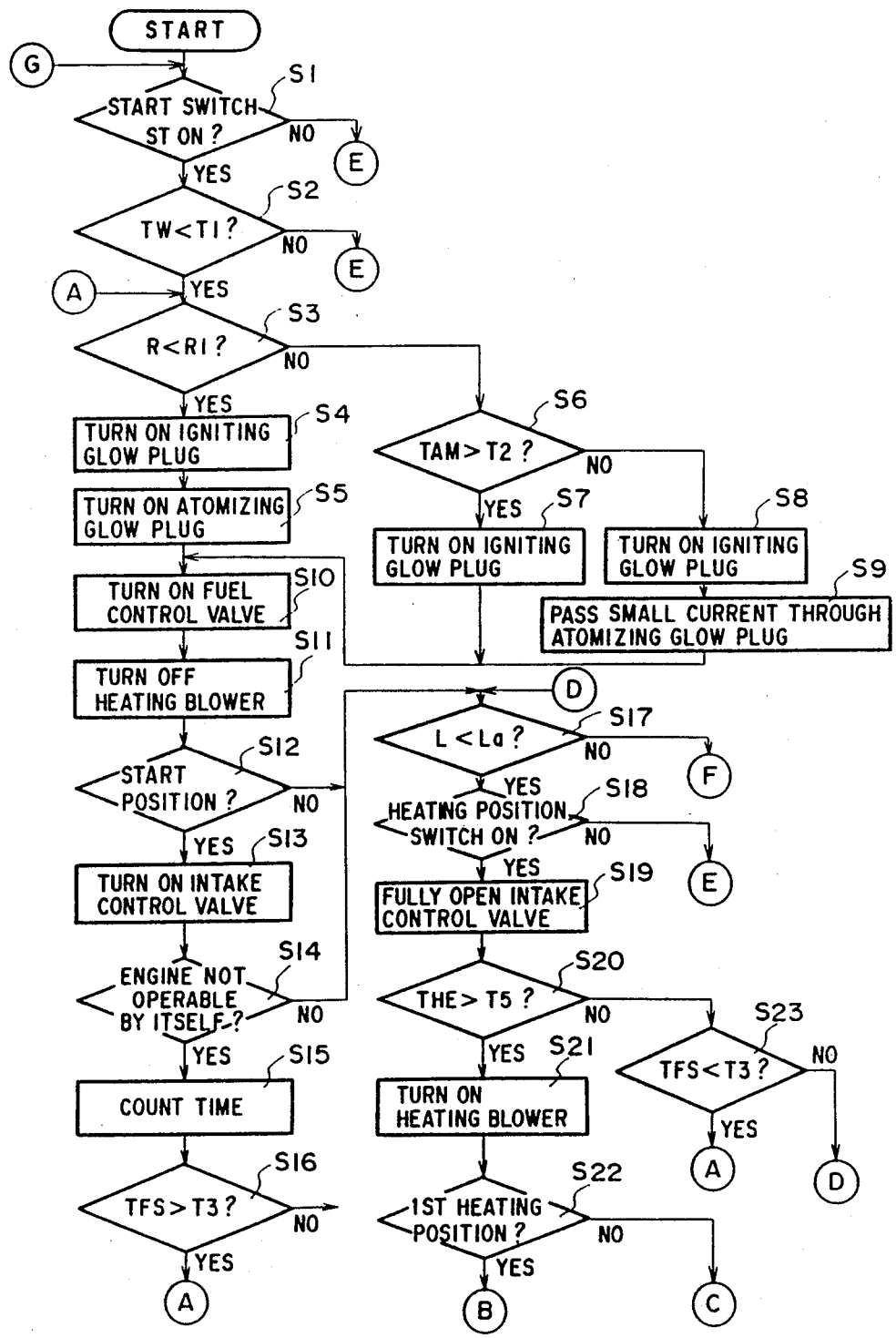
FIGS. 2(A) and 2(B) are a flowchart of a control sequence of the control device.
Figure 2:
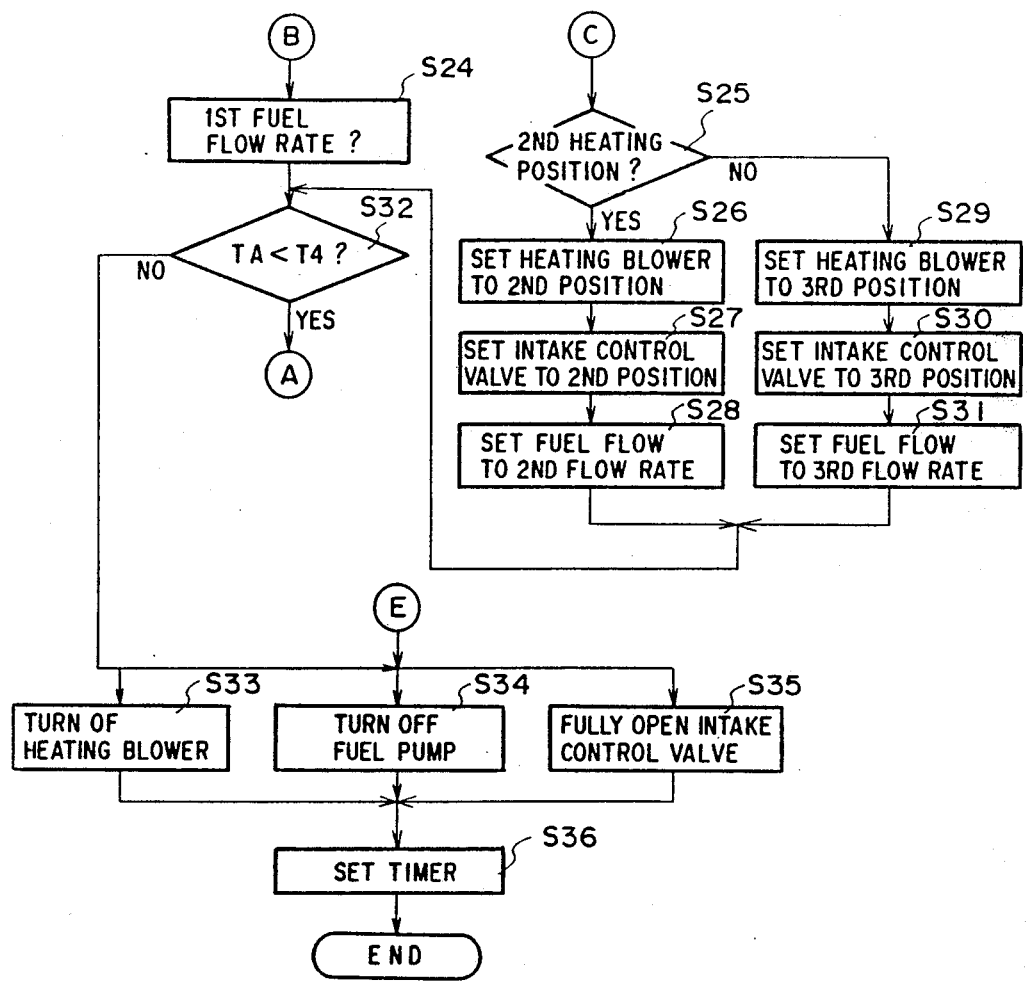

Operation of the control device will hereinafter be described with reference to the flowchart shown in FIGS. 2(A) and 2(B).

The starter switch 18 is first turned on in a step S1. When the starter switch 18 is turned on, electric power is supplied from the battery 17 to the controller 21 and other components, making the burner 6 ready for operation.

Based on a signal from the cooling water thermosensor 20, the controller 21 ascertains whether the cooling water temperature Tw is higher than a preset water temperature T1 in a step S2.

If the cooling water temperature Tw is lower than the preset water temperature T1, then the controller 21 ascertains whether the value R of the resistance (positive temperature coefficient) of the igniting glow plug 10 is greater than a preset resistance value R1 in a step S3.

Before the igniting glow plug 10 is energized, the controller 21 detects the resistance value R. If the resistance value R is smaller than the preset resistance value R1, since the temperature in the ignition and combustion chambers is low prior to fuel combustion, the controller 21 energizes the igniting glow plug 10 and the atomizing glow plug 92 in operating the burner 92 in steps S4, S5.

If the resistance value R of the igniting glow plug 10 is greater than the preset resistance value R1, the temperature in the ignition chamber is high, and the controller 21 ascertains whether the atmospheric temperature TAM is higher than a preset temperature T2 in a step S6.

If the atmosphere temperature TAM is higher than the preset temperature T2, since fuel can be atomized by absorbing the heat in the combustion chamber 71, only the igniting glow plug 10 is turned on in order to prevent fuel from being excessively atomized in a step S7.

If the atmospheric temperature TAM is lower than the preset temperature T2, the igniting glow plug 10 is turned on and a small current is passed through the atomizing glow plug 92 in steps S8, S9.

After the steps S4, S5, S7 or S8, S9 have been executed, the fuel control valve 15 is turned on to supply fuel in a step S10. Subsequent control will be described only briefly as it has not direct bearing on the control of the present invention.

Then, the heating blower 16 is turned off in a step S11, and the controller 21 ascertains whether the starter switch 18 is in a start position or not in a step S12. If in the start position, then the intake control valve 2 is turned on in a step S13, and the controller 21 ascertains whether the engine can operate by itself in a step S14.

If the engine cannot operate by itself, then, upon elapse of a preset time period in a step S15, the controller 21 ascertains whether the temperature TFS of the flame sensor 11 is higher or lower than a preset temperature T3 in a step S16. If higher, then control returns to the step S3.

If the starter switch 18 is not in the start position in the step S12, or if the engine can operate by itself in the step S14, the controller 21 reads a signal from the engine load sensor 22 and ascertains whether the engine load L is smaller than a preset load La in a step S17, and whether the heating position switch 23 is in a heating position or not in a step S18. If the engine load is smaller than the preset load La and the heating position switch 23 is in the heating position, then the intake control valve 2 is fully opened in a step S19, and the controller 21 ascertains whether the temperature THE of the heat exchanger 13 is higher than a preset temperature T5 based on a signal from the temperature sensor 14 in a step S20.

If the heat exchanger temperature THE is lower than the preset temperature T5, then the controller 21 ascertains whether the flame sensor temmperature TFS is higher or lower than the preset temperature %3 in a step S23. If the flame sensor temperature TFS is lower than the preset temperature T3, control goes back to the step S3, and if the flame sensor temperature TFS is higher than the preset temperature T3, control goes back to the step S17, until the heat exchanger temperature THE becomes higher than the preset temperature T5.

If the heat exchanger temperature THE is or becomes higher than the preset temperature T5, the heating blower 16 is turned on in a step S21 to introduce fresh air into the heat exchanger 13 to supply hot air into the vehicle compartment or cabin.

Then, the controller 21 ascertains whether the heating position switch 23 is a first heating position in a step S22. If in the first heating position, then the flow rate of fuel is set to a first flow rate in a step S24. If not in the first heating position, then the controller 21 ascertains whether the heating position switch 23 is in a second heating position in a step S25. If in the second heating position, then the heating blower 16 is set to a second position in a step S26, the intake control valve 2 is set to a second opening position in a step S27, and the fuel flow rate is set to a second flow rate in a step 28. If not in the second position, i.e., if in a third position, then the heating blower 16 is set to a third position in a step S29, the intake control valve 2 is set to a third opening position in a step S30, and the fuel flow rate is set to a third flow rate in a step 31.

After the heating blower 16 and others have been set to respective positions based on the heating position, the controller 21 ascertains whether the temperature TA of discharged air is higher than a preset temperature T4 in a step S32. If lower than the preset temperature T4, then control returns to the step S3, and if higher than the preset temperature T4, then the heating blower 16 is turned off in a step S33, a fuel pump (not shown) is turned off in a step S34, and the intake control valve 2 is fully opened in a step S35. Thereafter, a timer is set in a step S36.

With the present embodiment, as described above, the energization of the atomizing glow plug is controlled on the basis of signals from the sensors which detect the temperature in the combustion chamber and the atmospheric or ambient temperature. Therefore, fuel can be atomized in an optimum condition without an atomization failure due to excessive heating of the fuel, so that fuel can be burned well.

Although a certain preferred embodiment has been shown and described, it should be understood that many changes and modifications may be made therein without departing from the scope of the appended claims.

What I claim is:

1. An apparatus for controlling fuel combustion in a burner comprising:
    a combustion tube including an ignition chamber for igniting fuel and a combustion chamber for combusting fuel ignited by the ignition chamber;
    a fuel atomizer disposed in said combustion chamber and including an atomizing glow plug for heating and atomizing fuel, and a nozzle for ejecting atomized fuel into said ignition chamber;
    an igniting glow plug disposed in said ignition chamber for igniting the fuel atomized by the fuel atomizer;
    burner temperature detecting means for detecting the temperature in the burner;
    an ambient temperature sensor for detecting the temperature of air introduced into the burner; and
    control means for controlling electric power supplied to the atomizing glow plug based on a signal from said burner temperature detecting means and a signal from said ambient temperature sensor.

2. A device according to claim 1, wherein said temperature detecting means comprises means for detecting a current passed through said igniting glow plug which has a positive temperature coefficient or resistance.

3. A device according to claim 1, wherein said atomizing glow plug includes a resistive body having a positive temperature coefficient of resistance.

4. A device according to claim 1, wherein said atomizing glow plug comprises a body made of a ceramic material and a resistance wire embedded in said body.

5. An apparatus according to claim 1, wherein said burner temperature detecting means includes a flame sensor disposed in said combustion chamber.

* * * * *